US011517929B2

(12) United States Patent
Schmitt

(10) Patent No.: US 11,517,929 B2
(45) Date of Patent: Dec. 6, 2022

(54) LUBRICANT SPRAYING APPARATUS AND METHOD FOR TREATING INNER SURFACES OF INSERTION AND ASSEMBLY AIDS IN A PACKING STATION

(71) Applicant: SCHMITT PROF. MöHLMANN & COLLEGAN WIRTSCHAFTSKANZLEI INSOLVENZVERWALTER AKTIENGESELLSCHAFT, Zwickau (DE)

(72) Inventor: Jens Schmitt, Zwickau (DE)

(73) Assignee: SCHMITT PROF. MöHLMANN & COLLEGAN WIRTSCHAFTSKANZLEI INSOLVENZVERWALTER AKTIENGESELLSCHAFT, Zwickau (DE)

(*) Notice: Subject to any disclaimer, the term of this patent is extended or adjusted under 35 U.S.C. 154(b) by 182 days.

(21) Appl. No.: 16/962,670

(22) PCT Filed: Jan. 17, 2019

(86) PCT No.: PCT/DE2019/000009
§ 371 (c)(1),
(2) Date: Jul. 16, 2020

(87) PCT Pub. No.: WO2019/141306
PCT Pub. Date: Jul. 25, 2019

(65) Prior Publication Data
US 2021/0069742 A1 Mar. 11, 2021

(30) Foreign Application Priority Data
Jan. 17, 2018 (DE) .................... 10 2018 000 350.8

(51) Int. Cl.
*B05B 13/06* (2006.01)
*B05D 7/22* (2006.01)
(Continued)

(52) U.S. Cl.
CPC ...... *B05B 13/0278* (2013.01); *B05B 13/0271* (2013.01); *B05B 13/06* (2013.01);
(Continued)

(58) Field of Classification Search
CPC .................................................. B05B 13/0627
See application file for complete search history.

(56) References Cited

U.S. PATENT DOCUMENTS 3,441,448 A * 4/1969 Hayward ................ B29C 66/71
29/623.2
4,509,252 A 4/1985 Sabatino
(Continued)

FOREIGN PATENT DOCUMENTS

DE 102012021784 A1 5/2013
WO WO97/39970 A1 10/1997
WO WO2011/020469 A1 2/2011

*Primary Examiner* — Binu Thomas
(74) *Attorney, Agent, or Firm* — Brooks Kushman P.C.

(57) ABSTRACT

The invention relates to a lubricant spray system and to a lubricant application method for treating the inner surfaces of insertion and assembly aids in a packing station. In order to efficiently treat the the inner surfaces of hollow bodies with continuous openings with the lubricant spray using the lubricant spray system, a combination of related methods and systems of the lubricant application and use in a system with directly consecutive steps is required. The lubricant spray system (1), which is equipped with a suction device, comprises a spray station (2), a mounting station (4) and a spray station (3) between which an adjustment and sliding frame element (5), designed as an insertion and mounting aid, is arranged. According to the invention, after spraying the lubricant (20), the parts to be introduced into the hollow (Continued)

Figure 1:
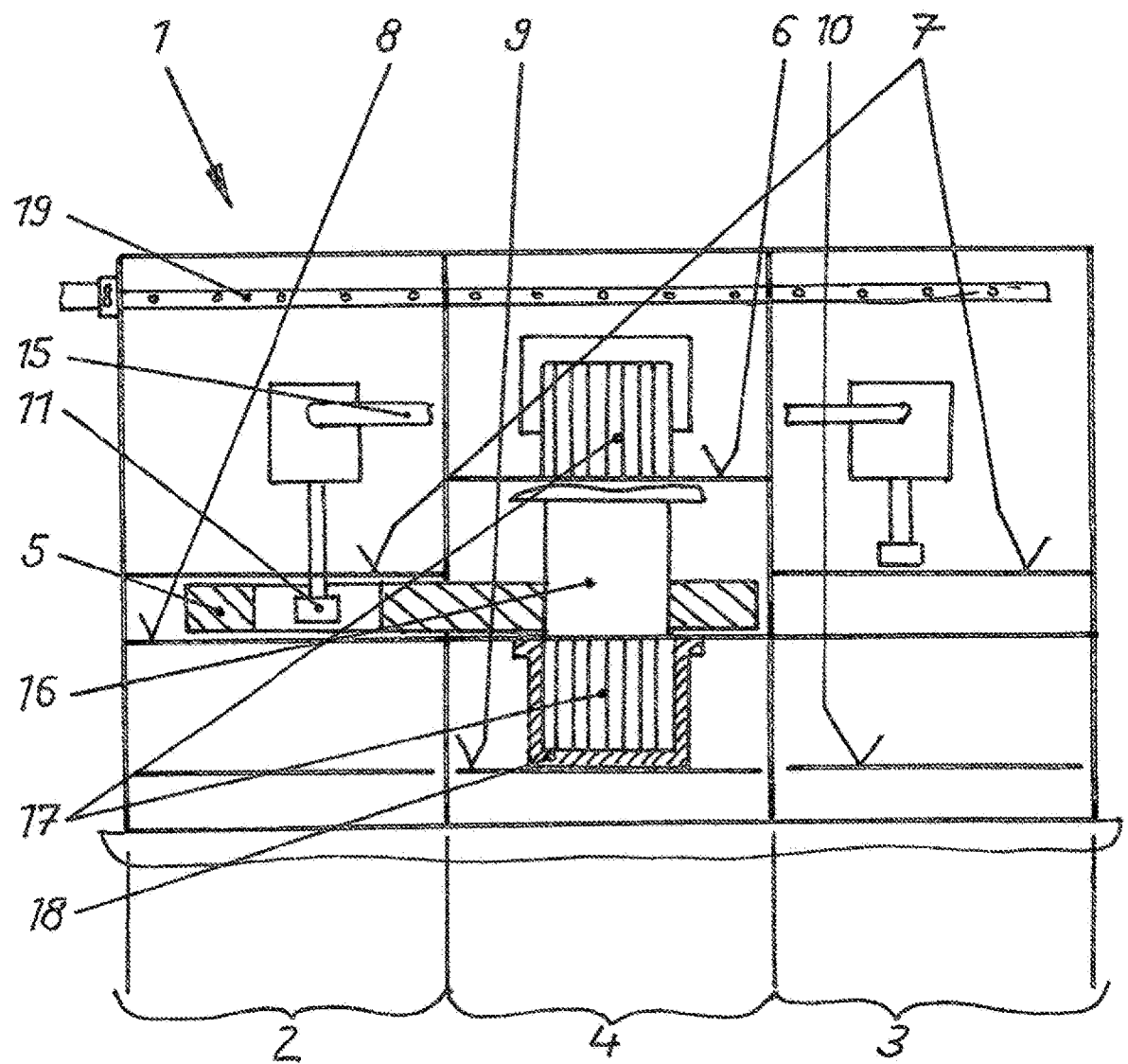

body openings can be subsequently inserted and slidingly moved (22) in a smooth and damage-free manner A particular area of application is the packaging of battery plate packs (13) in battery containers (14).

7 Claims, 7 Drawing Sheets

(51) Int. Cl.
*B05D 1/02* (2006.01)
*B05B 13/02* (2006.01)
*H01M 10/04* (2006.01)

(52) U.S. Cl.
CPC ............ *B05B 13/0627* (2013.01); *B05D 1/02* (2013.01); *B05D 7/22* (2013.01); *H01M 10/0404* (2013.01)

(56) References Cited

U.S. PATENT DOCUMENTS

| | | | | |
|---|---|---|---|---|
| 4,610,217 A * | 9/1986 | Czeiler | ............... | B05B 13/0681 118/47 |
| 5,078,313 A * | 1/1992 | Matheson | ........... | B05B 13/0235 118/318 |
| 5,474,609 A * | 12/1995 | Mulder | ................... | B05B 15/55 118/308 |
| 6,279,224 B1 * | 8/2001 | Wirtz | ................ | H01M 10/0413 29/711 |
| 2012/0240394 A1 * | 9/2012 | Meier | ............... | H01M 10/0404 29/787 |

\* cited by examiner

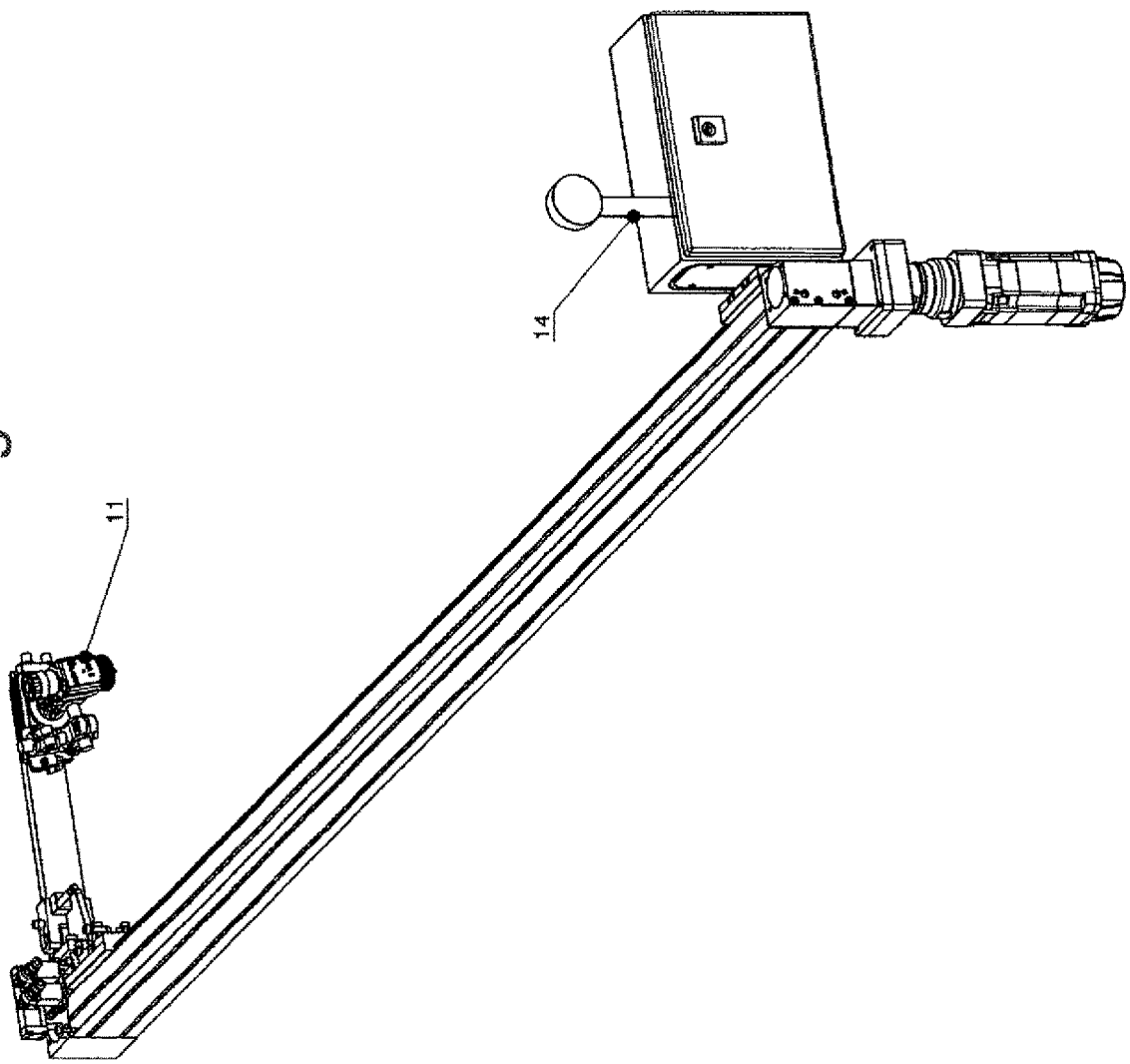

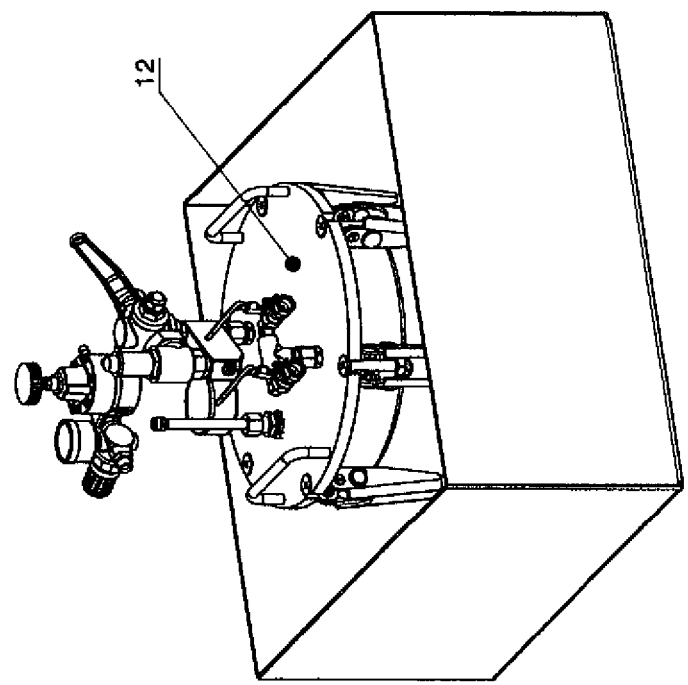

LUBRICANT SPRAYING APPARATUS AND METHOD FOR TREATING INNER SURFACES OF INSERTION AND ASSEMBLY AIDS IN A PACKING STATION

CROSS-REFERENCE TO RELATED APPLICATIONS

This application is the U.S. national phase of PCT Appln. No. PCT/DE2019/000009 filed Jan. 17, 2019, which claims priority to German Appn. No. 10 2018 000 350.8 filed Jan. 17, 2018, the disclosures of which are hereby incorporated in their entirety by reference herein.

The invention relates, with respect to an inner surface treatment of an adjusting and sliding frame designed as an insertion and assembly aid for insert parts in suitably sized hollow bodies by means of a lubricant spraying system in a packing station, to the design of this lubricant spraying system according to the generic term of patent claim 1 as well as to a lubricant application method according to the generic term of patent claim 6, with a respectively integrated preparation and composition of an effective sprayable lubricant to be provided.

The known state of the art is to design in a process-specific manner spraying systems for a surface application of certain material layers depending on the type, structure, dimensions as well as material of the objects or components to be treated. For reasons of plant safety, process rationality and the flowability and sprayability of the materials to be processed, compressed air atomization is mainly used as a low-pressure process.

Despite different surface coatings, for example with respect to paint as well as color varnish applications,
adhesive and sealant applications and
lubricant applications
comparable plant structures and component arrangements are known from prior-art spraying systems.

Examples of a large number of well-known spraying systems by means of which industrial surface coatings can be applied by spraying techniques are described in the intellectual property rights with innovative embodiments and arrangements of functional components referred to below.

Content of EP 3192587 A1 is an industrial spraying system referred to as "Device for siliconizing the inner surfaces of hollow bodies" for the application of this substance used as an adhesive and sealant on the inner surfaces of parts designed in the form of bottles. This system consists of one washing, spraying and heat treatment station each, through which the parts pass while lying on a conveyor belt.

Prior-art paint coating spray systems are described in the intellectual property right documents DE 95814—which comprises a spraying station with several spray heads swiveling in all directions for the spraying of containers, in particular containers in a stationary unaltered processing position and DD 111649—which is a spraying system consisting of two chamber-like spraying stations arranged at a conveyor for sanitary hollow parts to be glazed.

Lubricant spray systems for flat-lying base material, for example flat-lying deepdrawn substrate, which is transported on a conveyor belt to and past the spray heads, are dealt with in EP 2 006 029 A2 and DE 101 39 633 C1, involving flat-lying material to be sprayed with lubricant on both sides and on one side via the spray heads of a spray station.

The disadvantage of these two approaches is that spraying inner surfaces of hollow bodies cannot be carried out with these spray system designs.

The German patent application DE 10 2014 005 085 A1 "Cell block for an electric battery . . ." describes a process sequence for the attachment of retaining frames to each individual battery cell, with a joining machine being employed for their assembly in the cell block and, if a lot of force is to be exerted, joining agents also being used to reduce friction. However, the type of lubricant application in the form of spraying and an object-related spraying system are not mentioned therein.

The disadvantages of these sample solutions of spray systems, which are known from the state of the art and can also be used for lubricant application, are the availability of only one or two spraying stations with spraying heads arranged exclusively for the application of the spraying agent, the exclusive transfer of the flat material to be sprayed, such as sheet metal and hollow parts, by means of conveyor belts, the lack of a cost-reducing system- and process-related combination of sprayed lubricant application and a local and timely use of the lubricant layer, a missing work cycle of preparation, supply and spraying of the lubricant as well as the collection and reuse of residual lubricant amounts, the provision and teaching of safety measures regarding the use of volatile lubricants, and the design of a small and compact lubricant spraying system that can be integrated into a processing plant.

The state of the art also encompasses the manual spraying of the adjusting and sliding frames for the boxing of the finished battery plate packs into the empty battery boxes/containers provided by opening the safety device on a plant component and the possibly required removal of lubricant material remnants stripped off during boxing at the edges of the adjusting and sliding frame, followed by the subsequent manual spraying of these edges with a lubricant which is provided in spray bottles. Due to the fact that this procedure always requires intervention in the production plant and the manufacturing process, this is rarely done and not as and when required. As a result, the adjusting and sliding frames are only sprayed at longer intervals, which in turn causes the plant components to be impaired in terms of quality losses encountered during boxing due to the arising higher mechanical stresses the plant components must endure. Moreover, the use of spray bottles gives rise to an enormous amount of packaging waste, which must be disposed of at great expense with cost-intensive recycling activities needed.

It is therefore the objective of the present invention to provide a constructive and process-technological solution by means of which the known disadvantages of the prior art can be overcome. Said objective involves the determination of the plant structure and the component equipment of spraying systems for the application of lubricants in such an innovative way that the application method and the utilization process of a lubricant can be combined in an innovative, compactly designed installation. Moreover, it is necessary that the design of the system and the inventive step include a preparation and treatment component for the lubricant itself as well as safety provisions for the safe utilization of the lubricant employed.

As proposed by the invention, the objective of providing the design and structure of a lubricant spraying system for the inner surface treatment of insertion and assembly aids in a packing station is achieved by the features specified in patent claim 1 and the objective of realizing the process features for the provision and use of the lubricant suitable for this purpose as well as the necessary safety measures is reached by the features of patent claim 6, with the respective advantageous embodiments being described in the associated subclaims.

Accordingly, a lubricant spraying system for the treatment of the inner surfaces of an adjusting and sliding frame, which is used as an insertion and assembly aid for battery plate packs into suitably sized battery containers provided for this purpose, consists at first of a first spray station, a mounting station and a second spray station, which are arranged next to each other, and moving back and forth between these an horizontally movable adjusting and sliding frame is arranged which has the character of an aligning and adjusting device.

According to the invention, the lubricant spraying system comprises several horizontal functional levels.

At an upper feed level, battery plate packs positioned, sorted and each fixed with a clamping plate device can be moved by a linear drive into a middle position of the mounting station.

On an upper working level, the spray heads as well as the exhaust system are arranged in spray station 1 and spray station 2.

At least two adjusting and sliding frames of single design or one double frame with square inner openings are arranged on a middle working level, said frames being linearly aligned and longitudinally movable to and fro in coordinated cycle times between the spraying stations and the mounting station.

At a lower working level, via a downwardly movable infeed rod resting on the front end above the battery plate pack, its lowering infeed and sliding movement through an adjustment and sliding frame and further movement, a sliding insertion and deposition of the battery plate pack into the battery container can be realized.

After opening and lifting out the clamping plate device, the inner surfaces of the adjusting and sliding frame are released and moved away from the mounting station towards spray station 1 or spray station 2, whereby the assembled batteries can be moved out and away from the lubricant spraying system at a lower working level. This arrangement of function levels allows a time-coordinated and controllable system usage on all function levels.

Supplementary features for the design of a lubricant spraying system are described in claims 2 and 3. They are related to the design of the functional components by means of which the lubricant application is prepared and carried out as well as the arrangement of the adjusting and sliding frame.

An essential feature of the lubricant spraying system is the provision of a lubricant tank provided with agitator. For this purpose, a pressureless lubricant storage tank is permanently installed in the vicinity of the spray stations and connected to a ring main which is responsible for the supply and discharge of the lubricant. This offers the advantage that a settling of the lubricant in said main is prevented and excess lubricant can be collected and returned to the storage tank.

A feed pump for lubricant conveying is located in the ring main proper. In connection with the material flow regulator arranged in the ring main, the material flow of the lubricant can be specifically adjusted and regulated in quantity and pressure to meet the respective requirements so that pressurizing of the material storage tank is not necessary. The material flow regulator is located inside the ring main, downstream of the lubricant pump and upstream of the spray head, arranged in at least one spray station. For precise positioning at the respective spray positions, the spray head itself is stationarily arranged on a servo-axis driven by a servomotor moving the spray head in a stepless linear manner.

The spray head is pneumatically controlled and permanently connected to the ring main. Advantageously, the spray head is mounted such that it can be rotated and swiveled in order to coat all the required areas of the inboxing frame with lubricant in the respective position of the spray head. With a view to moving the spray head to the respective spraying position it is also possible to make use of a robot arm. Selecting this variant depends on the space available in the system design and the customer's specifications and preferences.

To rule out explosion hazards, the entire area of the spray stations is kept with respect to ventilation under negative pressure by means of an exhaust system arranged in these areas.

The process flow is characterized by the continuously and successively performed process steps of lubricant spraying and horizontal station changing movement of an adjusting and sliding frame between the spray stations 1 and 2 as well as the mounting station, continued by the lowering insertion and mounting of a battery plate package as well as feeding and discharge movements and sensor-monitored controls of process settings during the entire process sequence.

As proposed by the invention, the lubricant used for the treatment of the inner surfaces of the adjusting and sliding frames consists of a mixture of polytetrafluoroethylene, also known under the abbreviation PTFE and the trade name Teflon, and isopropanol. Isopropanol is used as a carrier material in this case. This material composition ensures a flowable and sprayable lubricant application of the lubricant polytetrafluoroethylene in the lubricant spraying system.

Polytetrafluoroethylene is kept flowable by the admixed carrier substance and constantly homogenized in the lubricant tank by means of an agitator, fed via a lubricant ring main to the spray heads in the spray stations and applied as an adhering spray mist to the inner surfaces of the adjusting and sliding frames by means of the spray heads.

In order to be able to monitor the necessary use of the lubricant, pressure load cells are arranged on the infeed rod to obtain information about the slide-in pressure required to inbox the battery plate packs passing through the adjustment and sliding frames into the battery containers provided. In the event this necessary pressure exceeds a specified value, said load cells transmit this information to the control of the lubricant spraying system. The material pressure is initially set once and is required to adjust the spray mixture. If the limiting value is exceeded at the load cells, only the change-frame command is triggered causing the second sliding and adjustment frame previously prepared with lubricant to be pushed in.

In order to ensure a smooth process flow, the entire area where lubricant spraying takes place is exhausted by means of an exhaust system installed in this area with a view to creating a negative pressure preset in the pipe on the negative pressure side. This is intended to prevent the arising spray mist from spreading and igniting in the system.

The invention is presented in a simplified form using an embodiment example.

Figure 2:
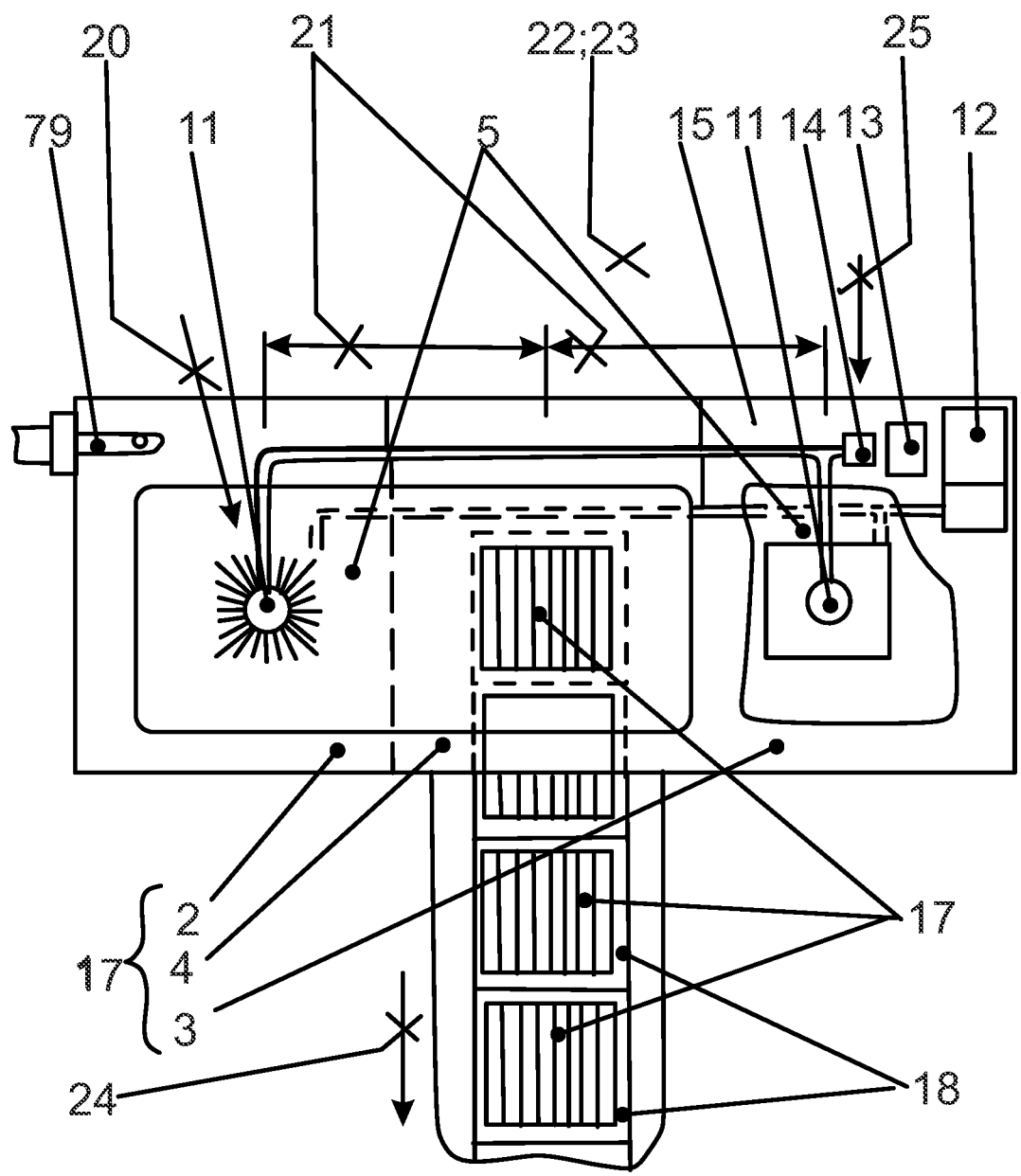
Figure 3:
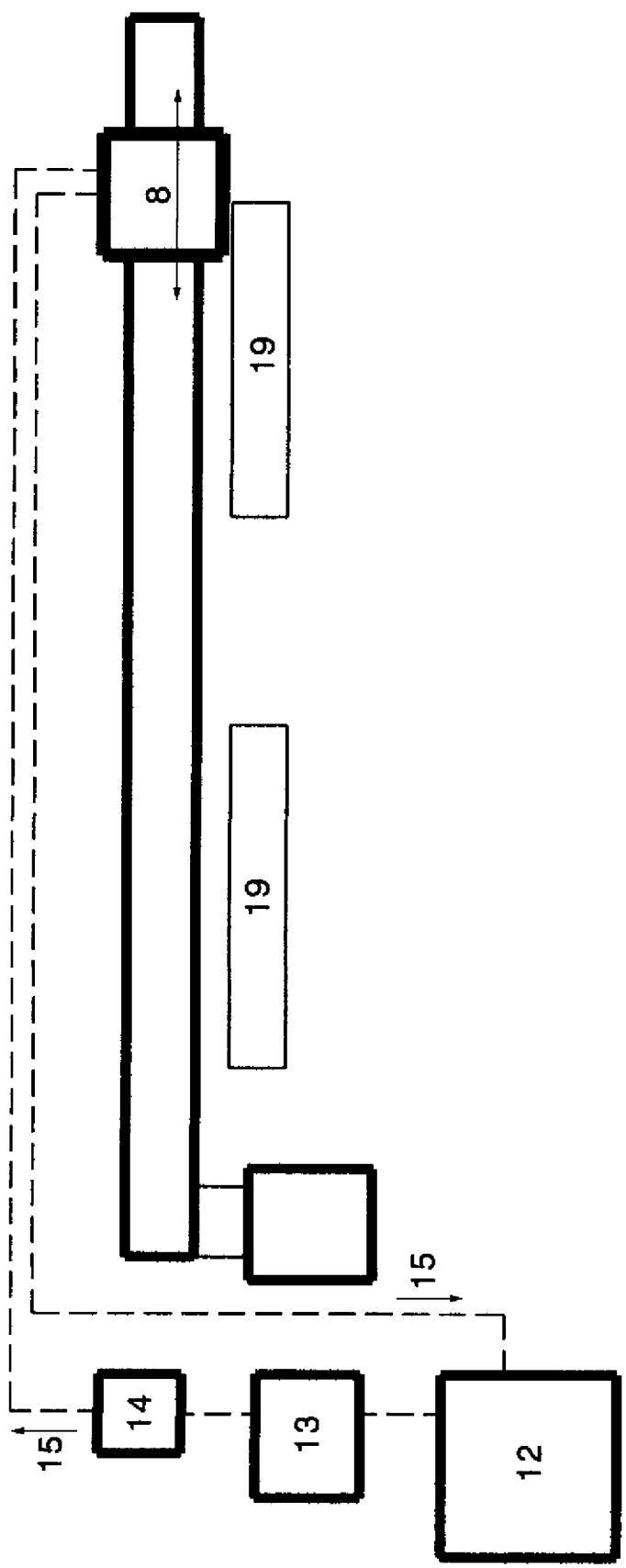
Figure 4:
Figure 5:
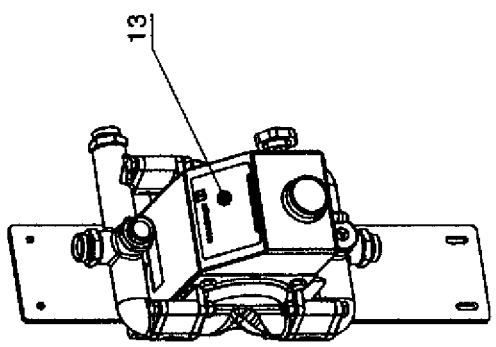

The enclosed figures provide elucidation as follows:

FIG. 1: is a schematic front view of the lubricant spraying system showing a simplified structural representation;

FIG. 2: illustrates a schematic plan view according to FIG. 1, based on the middle working level;

FIG. 3: is a schematic representation of the apparatus components as frontal view;

FIG. 4: shows as plan view a schematic representation of a spraying area;

FIG. 5: is a representation of the feed pump;

FIG. 6: is a representation of a spray area as isometric view and

FIG. 7: shows a representation of the lubricant tank with agitator.

The lubricant spraying system shown schematically in FIG. 1 shows the major functional parts of the system arranged side by side, i.e.

Spray station 1 (2),
Assembly station 4 and
Spray station 2 (3), with the functional components arranged in them, such as the exhaust system 19, to produce a negative pressure in the housing and the spray heads 11 in the spray stations 1 and 2, which are in terms of material flow connected by the ring main 15, as well as the infeed rod 16 in mounting station 4. In addition to this representation of a basic plant structure, the functional process structure is illustrated by means of the visual representation of the functional levels extending horizontally through the lubricant spraying plant 1, as listed hereunder:

the upper feed level 6 for the feeding of the battery plate packs 17 and arranged below;

the upper working level 7, where the lubricant supply and the application of lubricant via the spray heads 11 and the air exhaust for producing a slight negative pressure take place, with the infeed rod 16 with load cells being arranged in the movable upper portion of the mounting station 4;

the middle working level 8 where the change-station movement of the adjusting and sliding frame 5 is carried out;

the lower working level 9, where, as a result of the downward stroke movement of the infeed rod 16, a front-end arranged, sorted, completely finished and clamped battery plate pack 17 is inserted through the bottom opening in the adjustment and sliding frame 5, lowering it and sliding it into the battery container 18, which is positioned underneath, and the lower discharge level 10 where the fully assembled battery is moved from mounting station 4 out of the lubricant spraying unit 1.

The lubricant spraying system illustrated in FIG. 2 as a view of the middle working level shows, in addition to the visible structural device features with directional arrows, the feasible process steps and their points of effectiveness in the system parts and on the functional components.

Process step: Lubricant spraying 20 alternately in spray stations 1 and 2

Process step: Change station movement 21 related to the adjusting and sliding frame 5 between one of the spray stations 1 and 2 and the mounting station 4

Process step: Infeed and sliding movement 22 in the mounting station 4

Process step: Insertion and mounting 23 in mounting station 4 and

Process step: Feeding and discharge movements 24 into and out of the mounting station 4.

Aside from this, the process step of the process flow controls 25 is carried out, which is shown in FIG. 2 by way of the example of the lubricant flow control in the ring main 15, which is realized by means of a material flow regulator 14.

In addition, FIG. 2 shows the adjusting and sliding frame 5 in the design form of a double frame with two internal openings arranged next to each other for sliding in and through one battery plate pack 17 each and inserting and mounting it in a battery container 18 suitably positioned underneath.

FIGS. 4 to 6 show the spray area as a top view, the feed pump for conveying the lubricant, and the lubricant tank with agitator, these representing components and details of the apparatus as they are required for the supply of the material mixture. Putting the liquid lubricant to use as well as the discharge and return of drained and removed lubricant residues are carried out via ring main 15, as is shown schematically in FIGS. 1 to 4, with the lubricant tank 12 with agitator, the lubricant feed pump 13, the material flow and pressure regulator 14 and the spray heads 11 being interconnected by means of a main.

Not shown in the figures are the movement actuating drives, the sensory control components and the system and functional safety elements of the lubricant spraying system 1.

Aside from the assembly of battery elements, other hollow body finishes can also be carried out using lubricants.

Making use of and adopting the apparatus proposed by the invention as well as the method which can be carried out with this apparatus for the treatment of inner surfaces of adjusting and sliding frames, which are employed in this usage case as an insertion and assembly aid for battery plate packs to be mounted in suitably sized battery containers, make it possible, with the assistance of insertion aids and the automatic and regulated supply of an efficient liquid lubricant, associated with a simultaneous dosed exhaust ventilation of excess spray mist being provided to avoid explosion hazards, that an unimpaired and smooth process of inboxing finished battery plate packs into battery containers provided for this purpose can take place. This objective in mind, it is advantageous for the invention that spraying of the inner surfaces of the sliding and adjustment frames is carried out alternately through a spray nozzle, which is either positioned above the inner surfaces of the sliding and adjustment frames to be wetted in the form of a stationary and swivel-mounted spray head through which lubricant spraying takes place or through a swivel arm, with front-mounted spray head, arranged outside the spraying stations and swiveling into the respective spraying station.

In this way, the inventive technical solution proposed avoids the disadvantages of the state of the art just as reliably as it avoids that packaging waste of lubricant stored in small packages accumulates in large quantities, which would otherwise have to be disposed of and reprocessed/recycled at great expense, with a specifically determined and actually required application quantity of the lubricant being applied by means of a material flow regulator, which prevents the application of excessive lubricant amounts.

LIST OF REFERENCE NUMERALS

With Respect to System Components:
1 Lubricant spraying system
2 Spray station 1
3 Spray station 2
4 Mounting station
5 Adjusting and sliding frame
6 Upper feed level 7 Upper working level
8 Middle working level
9 Lower working level
10 Lower discharge level
11 Spray heads
12 Lubricant tank with agitator
13 Lubricant feed pump
14 Material flow and pressure regulator
15 Ring main
16 Infeed rod with load cells
17 Battery plate pack
18 Battery container
19 Exhaust system
With Respect to Process Steps:
20 Lubricant spraying
21 Change station movement
22 Infeed and sliding movement
23 Insertion and mounting
24 Feeding and discharge movements
25 Process flow controls (for example with 14)

The invention claimed is:

1. Lubricant spraying system 1 for treatment of the inner surfaces of insertion and assembly aids with through-openings, for an inboxing of battery plate packs (17) into suitably sized battery containers (18) in a boxing station, characterized in that a lubricant spraying system (1) equipped with an exhaust system (19) consists of a a first spray station (2), second spray station (3), a mounting station (4) arranged between these, between which an adjusting and sliding frame (5) constructed as a hollow body is arranged so as to be movable in a horizontally directed manner, wherein the spray stations (2, 3) each being equipped with at least one stationarily positioned and pivotably arranged spray head (11) for lubricant spraying, and at least one vertically directed infeed rod (16) equipped with load cells and capable of vertical lifting movement being arranged on a movable upper part of the mounting station (4), in that there is a plurality of horizontal functional levels in the lubricant spraying system (1), wherein
  on an upper feed level (6) over a feed section, battery plate packs (17) positioned, sorted and each fixed by a clamping jaw device is moved by a linear drive into a middle position in the mounting station (4),
  arranged on an upper working level (7) are the spray head of each of the first spray station (2) and the second spray station (3),
  on a middle working level (8), the adjusting and sliding frames (5) are arranged, designed in the form of at least two single frames or one double frame each with square inner openings each, longitudinally movable to and fro in coordinated cycle times between the spraying stations (2, 3) and the mounting station (4) in a linear direction, and wherein
  on a lower working level (9) the lowered infeed rod (16) is arranged, which abuts on the end faces of the battery plate packs (13) via the clamping jaw device and, during a lowering insertion and sliding movement of which, passing through the adjusting and sliding frame (5) arranged on the middle working level (8), is temporarily positioned into the empty battery containers (18) transferred to and arranged on the lower working level (9) and, after the battery plate packs (17) have been boxed into the battery containers (18), is moved back from this position to the middle working level.

2. Lubricant spraying system (1) according to claim 1, characterized in that the spray head (11), which is positioned so as to be stationary in the first spray station (2) and in the second spray station (3) in a pivotally movable manner, are arranged in a line-connected configuration via a ring main (15) for the supply and discharge of the liquid lubricant by means of compressed air via a lubricant tank (12) by means of a feed pump (13) and a material flow and pressure regulator (14) for the lubricant, with the lubricant tank being equipped with an agitator for homogenizing the liquid lubricant provided, and wherein a permanent negative pressure is produced by means of an exhaust system (19) in a housing of the lubricant spraying system (1).

3. Lubricant spraying system (1) according to claim 1, characterized in that external to the first and second spray stations (2, 3) there is arranged at least one swivel arm which is swiveled into the first and second spray stations (2, 3) and has a spray head (11) arranged on the front side.

4. Method related to and being applied with a lubricant spraying system (1) for the treatment of inner surfaces of an adjusting and sliding frame (5) which serves as an insertion and mounting aid for battery plate packs (17) into suitably sized battery containers (18) according to anyone of claims 1, 2 and 3, characterized by the following process steps, i.e.
  Lubricant spraying (20) on the inner surfaces of the adjusting and sliding frame (5) in the first and second spray stations (2, 3);
  horizontal change-station movement (21) of the adjusting and sliding frame (5) from one of the spray stations 1 and 2 (2, 3) to the mounting station (4) and back;
  lowering infeed and sliding movement of one battery plate pack (17) each passing through the adjusting and sliding frame (5) followed by;
  lowering and sliding insertion and mounting (23) of this battery plate pack (17) into a suitably sized and positioned battery container (18), and immediately following this without time interruption in a coordinated sequence as process steps;
  feeding and discharge movements (24) of battery plate packs (17) and battery containers (18) towards the mounting station (4) and, with the battery plate packs being assembled, away from said station, as well as
  sensor-monitored process flow controls (25) and process changes being implemented in an automated manner,
  wherein during the entire process sequence the ambient air area of the lubricant spraying activity (20) being kept under negative pressure on the air pressure side by means of the exhaust system (19) thus meeting process safety requirements.

5. Method according to claim 4, characterized in that a mixture of polytetrafluoroethylene and isopropanol is used as the lubricant, which is homogenized and used in liquid state, wherein the polytetrafluoroethylene due to admixed carrier material is rendered flowable and transferred pressureless from a lubricant tank (12) with agitator via a lubricant ring main (15) to the spray heads (11) and is applied via the spray heads (11) in the form of an adhering spray mist to the inner surfaces of the adjusting and sliding frames (5).

6. Method according to claim 4, characterized in that the sensor-monitored process flow control for determining an amount of lubricant to be used and thus for the horizontal change-station movement (21) of the adjusting and sliding frame (5) is carried out in an information-related and process-regulating way by means of the load cells arranged on the infeed rod (16) and serving to measure and monitor a predetermined insertion pressure.

7. Method according to claim 4, characterized in that the sensor-monitored process flow control for the determination of the amount of lubricant required and thus for the horizontal change-station movement (21) of the adjusting and sliding frames (5) is carried out in a process regulating manner by means of a prescribed/preset interval.

\* \* \* \* \*

UNITED STATES PATENT AND TRADEMARK OFFICE
CERTIFICATE OF CORRECTION

| | |
|---|---|
| PATENT NO. | : 11,517,929 B2 |
| APPLICATION NO. | : 16/962670 |
| DATED | : December 6, 2022 |
| INVENTOR(S) | : Jens Schmitt |

It is certified that error appears in the above-identified patent and that said Letters Patent is hereby corrected as shown below:

In the Claims

Column 8, Line 20, Claim 4 after "battery containers (18) according to" delete "anyone" and insert --any one--.

Signed and Sealed this
Seventeenth Day of September, 2024

Katherine Kelly Vidal
*Director of the United States Patent and Trademark Office*